United States Patent
Ogawa

(10) Patent No.: US 12,499,561 B2
(45) Date of Patent: Dec. 16, 2025

(54) OBJECT TRACKING DEVICE, OBJECT TRACKING METHOD, AND RECORDING MEDIUM

(71) Applicant: NEC Corporation, Tokyo (JP)

(72) Inventor: Takuya Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 326 days.

(21) Appl. No.: 18/033,425

(22) PCT Filed: Oct. 30, 2020

(86) PCT No.: PCT/JP2020/040792
§ 371 (c)(1),
(2) Date: Apr. 24, 2023

(87) PCT Pub. No.: WO2022/091335
PCT Pub. Date: May 5, 2022

(65) Prior Publication Data
US 2023/0419510 A1   Dec. 28, 2023

(51) Int. Cl.
*G06T 7/246* (2017.01)

(52) U.S. Cl.
CPC .................. *G06T 7/248* (2017.01)

(58) Field of Classification Search
CPC .................................................. G06T 7/248
See application file for complete search history.

(56) References Cited

U.S. PATENT DOCUMENTS

| | | | |
|---|---|---|---|
| 7,720,257 B2 * | 5/2010 | Morellas | G06V 10/24 382/103 |
| 2003/0219147 A1 | 11/2003 | Nishiura | |
| 2007/0154066 A1 * | 7/2007 | Lin | G06T 7/277 382/173 |
| 2016/0092739 A1 | 3/2016 | Oami et al. | |
| 2018/0068448 A1 * | 3/2018 | Rastgar | G06T 7/73 |
| 2018/0374233 A1 * | 12/2018 | Zhou | G06F 18/22 |

FOREIGN PATENT DOCUMENTS

| | | | |
|---|---|---|---|
| CN | 113763417 B | * | 7/2023 |
| JP | 2003-346157 A | | 12/2003 |
| JP | 2010-072782 A | | 4/2010 |
| JP | 2016-071830 A | | 5/2016 |
| JP | 2018-112890 A | | 7/2018 |
| JP | 2019-192048 A | | 10/2019 |

OTHER PUBLICATIONS

JP Office Action for JP Application No. 2022-558744, mailed on Nov. 21, 2023 with English Translation.
International Search Report for PCT Application No. PCT/JP2020/040792, mailed on Dec. 28, 2020.

* cited by examiner

*Primary Examiner* — Pinalben Patel
(74) *Attorney, Agent, or Firm* — Sughrue Mion, PLLC

(57) ABSTRACT

In an object tracking device, an extraction means extracts target candidates from time series images. A search range update means updates a search range based on frame information of a target in a previous image in a time series and movement information of the target. A tracking means searches for and tracks the target using a confidence level indicating similarity with a target model, from among the target candidates extracted in the search range. A model update means updates the target model using the target candidates extracted in the search range.

5 Claims, 11 Drawing Sheets

(PROCESS P1)
APPLY TEMPLATE IN TARGET SEARCH RANGE (PROCESS P2)
APPLY WEIGHTS AT MOVEMENT DIRECTION SIDE (PROCESS P3)
EXTEND MOVEMENT DIRECTION (PROCESS P4)
SHIFT CENTER OF WEIGHTS BASED ON PREVIOUS TARGET POSITION AND MOVEMENT AMOUNT

OBJECT TRACKING DEVICE, OBJECT TRACKING METHOD, AND RECORDING MEDIUM

This application is a National Stage Entry of PCT/JP2020/040792 filed on Oct. 30, 2020, the contents of all of which are incorporated herein by reference, in their entirety.

TECHNICAL FIELD

The present disclosure relates to a technique for tracking each object in an image.

BACKGROUND ART

An object tracking method is known to detect a specific object in a video image as a target, and to track a movement of a target in an image. In object tracking, features of the target in the image are extracted and each object with similar features is tracked as the target.

Patent document 1 describes an object tracking method which takes into account overlapping of objects. In addition, Patent Document 2 describes a method for predicting a position of each object in a current frame based on a tracking result of a previous frame, and for determining a search range of the object from the predicted position.

PRECEDING TECHNICAL REFERENCES

Patent Document

Patent Document 1: Japanese Laid-open Patent Publication No. 2018-112890
Patent Document 2: Japanese Laid-open Patent Publication No. 2016-071830

SUMMARY

Problem to be Solved by the Invention

One problem in an object tracking technology is a phenomenon known as "passing over". This refers to a phenomenon in which, when an object similar to a target appears while the target is being tracked and passes by or blocks the target, an object tracking device subsequently erroneously discriminates and tracks the similar object as the target. Once the passing over occurs, it becomes very difficult to return to the correct target because the object tracking device subsequently learns features of the similar object and continues to track the similar object.

It is one object of the present disclosure to prevent the passing over in the object tracking device.

Means for Solving the Problem

According to an example aspect of the present disclosure, there is provided an object tracking device including:
an extraction means configured to extract target candidates from time series images;
a search range update means configured to update a search range based on frame information of a target in a previous image in a time series and movement information of the target;
a tracking means configured to search for and track the target using a confidence level indicating similarity with a target model, from among the target candidates extracted in the search range; and
a model update means configured to update the target model using the target candidates extracted in the search range.

According to another example aspect of the present disclosure, there is provided an object tracking method including:
extracting target candidates from time series images;
updating a search range based on frame information of a target in a previous image in a time series and movement information of the target;
searching for and tracking the target using a confidence level indicating similarity with a target model, from among the target candidates extracted in the search range; and
updating the target model using the target candidates extracted in the search range.

According to a further example aspect of the present disclosure, there is provided a recording medium storing a program, the program causing a computer to perform a process including:
extracting target candidates from time series images;
updating a search range based on frame information of a target in a previous image in a time series and movement information of the target;
searching for and tracking the target using a confidence level indicating similarity with a target model, from among the target candidates extracted in the search range; and
updating the target model using the target candidates extracted in the search range.

EXAMPLE EMBODIMENTS

In the following, example embodiments will be described with reference to the accompanying drawings.

First Example Embodiment

[Overall Configuration of an Object Tracking Device]

Figure 1:
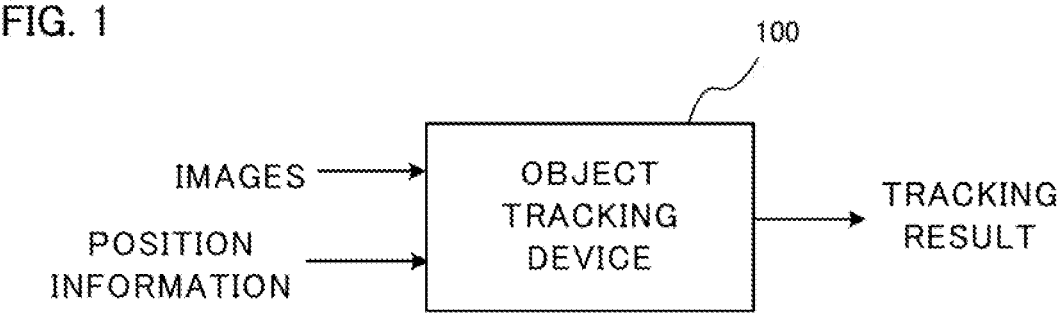
FIG. 1 is a block diagram illustrating an overall configuration of an object tracking device of a first example embodiment.

FIG. 1 illustrates an overall configuration of an object tracking device of a first example embodiment. An image including an object to be tracked (called a "target") and position information indicating a position of the target in the image are input to an object tracking device 100. Note that the input image is a video image obtained from a camera or a database, that is, a time series image (continuous image sequence) that forms a video. The object tracking device 100 generates a target model which indicates characteristics of the target specified by a position in the input image, and detects and tracks each object similar to the target model as the target in each frame image. The object tracking device 100 generates a frame that encompasses the target in the input image (hereinafter referred to as "target frame"). The object tracking device 100 outputs, as tracking results, frame information indicating a position and a size of each frame (hereinafter referred to as a "target frame") in the input image and an image displaying the target frame on an original video image.

[Hardware Configuration]

Figure 2:
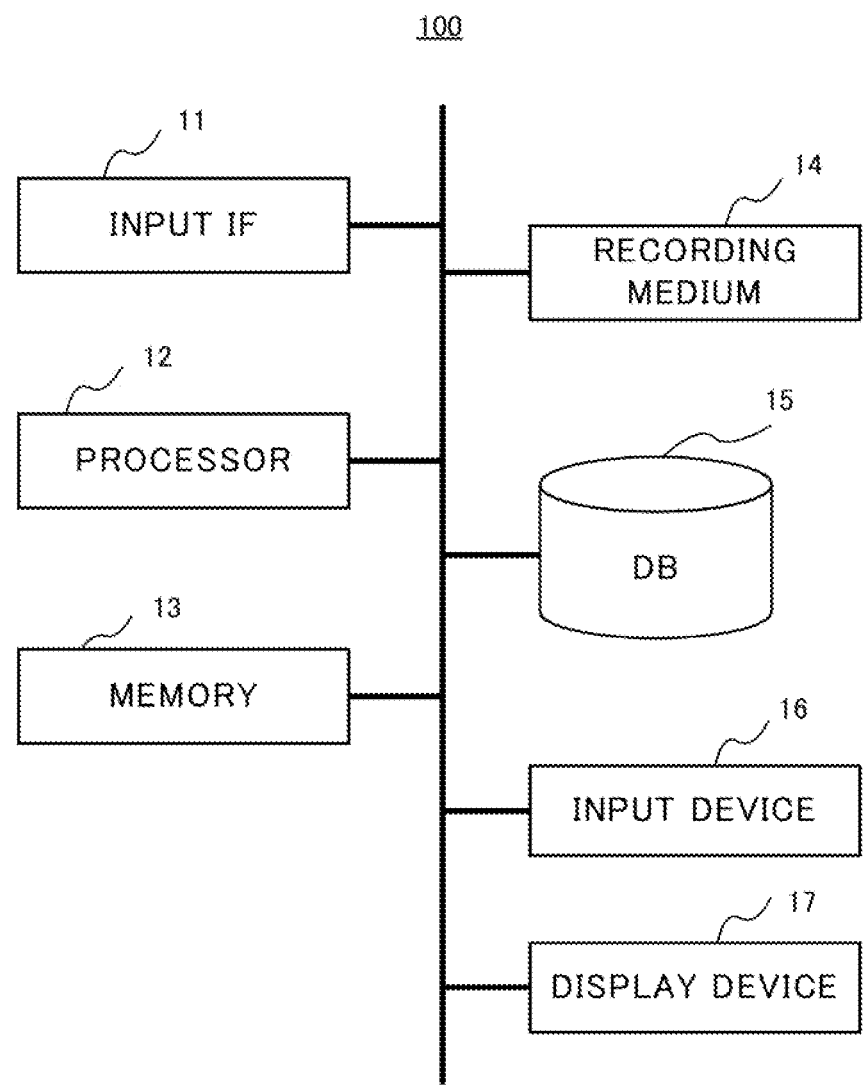
FIG. 2 is a block diagram illustrating a hardware configuration of the object tracking device of the first example embodiment.

FIG. 2 is a block diagram illustrating a hardware configuration of the object tracking device 100 of the first example embodiment. As illustrated in the FIG. 2, the object tracking device 100 includes an input IF (InterFace) 11, at least one processor 12, a memory 13, a recording medium 14, a database (DB) 15, an input device 16, and a display device 17.

The input IF 11 inputs and outputs data. Specifically, the input IF 11 acquires an image including the target and also acquires the position information indicating an initial position of the target in the image.

The processor 12 is a computer such as a central processing unit (CPU) or graphics processing unit (GPU), which controls the entire object tracking device 100 by executing programs prepared in advance. In particular, the processor 12 performs a tracking feature model generation process, a target model generation process, and a tracking process described below.

The memory 13 is formed by a ROM (Read Only Memory), a RAM (Random Access Memory), and the like. The memory 13 stores various programs executed by the processor 12. The memory 13 is also used as a working memory during executions of various processes by the processor 12.

The recording medium 14 is a nonvolatile and non-transitory recording medium, such as a disk-shaped recording medium or a semiconductor memory, and is removable from the object tracking device 100. The recording medium 14 records various programs to be executed by the processor 12.

The DB 15 stores data input from the input IF 11. Specifically, the DB 15 stores images including the target. In addition, the DB 15 stores information such as the target model used in object tracking.

The input device 16 is, for instance, a keyboard, a mouse, a touch panel, or the like, and is used by a user to provide necessary instructions and inputs related to processes by the object tracking device 100. The display device 17 is, for instance, a liquid crystal display, or the like, and is used to display images illustrating the tracking results or the like.

[Functional Configuration]

Figure 3:
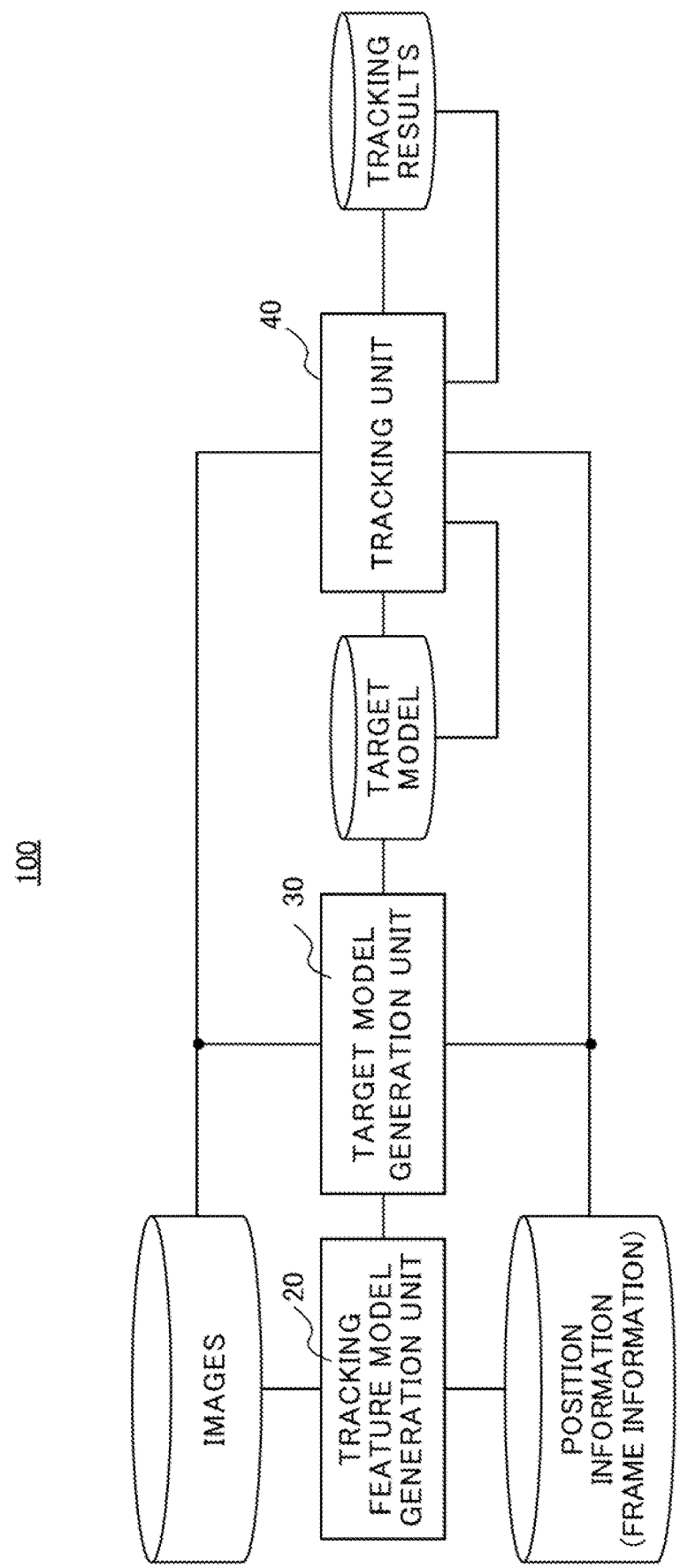
FIG. 3 is a block diagram illustrating a functional configuration of the object tracking device of the first example embodiment.

FIG. 3 is a block diagram illustrating a functional configuration of the object tracking device 100. The object tracking device 100 includes a tracking feature model generation unit 20, a target model generation unit 30, and a tracking unit 40. The tracking feature model generation unit 20 generates a tracking feature model based on the input image and the position information of the target in the input image, and outputs the tracking feature model to the target model generation unit 30. The target model generation unit 30 generates a target model indicating the features of the target based on the input image, the position information of the target in the image, and the tracking feature model, and outputs the target model to the tracking unit 40. The tracking unit 40 detects and tracks the target from the input image using the target model, and outputs tracking results. The tracking unit 40 also updates the target model based on the detected target. Each of elements is described in detail below.

Figure 4:
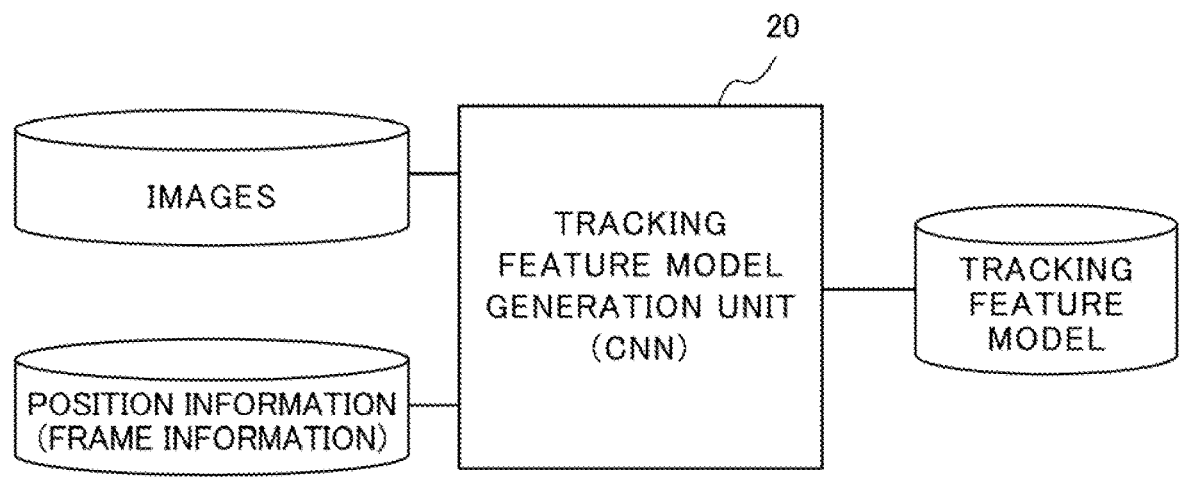
FIG. 4 is a block diagram illustrating a configuration of a tracking feature model generation unit.

FIG. 4 illustrates the tracking feature model generation unit 20. The tracking feature model generation unit 20 generates the tracking feature model. The "tracking feature model" is a model in which features to be focused on in tracking the target are learned in advance. In this embodiment, the tracking feature model generation unit 20 is formed by a feature extractor such as a CNN (Convolutional Neural Network). The tracking feature model generation unit 20 learns basic features of an object to be a target and generates the tracking feature model. For instance, when the target to be tracked is a "specific person," the tracking feature model generation unit 20 learns features of a general "person (human)" using input images.

In the above example, the position information indicating the position of the person in the image is input to the tracking feature model generation unit 20 along with the input image. The position information of an area of the person is input, for instance, by the user designating a frame which encompasses the person in the image displayed on the display device 17 by operating the input device 16. Alternatively, an object detector which detects the person from the input image may be provided in a previous stage, and the position of the person detected by the object detector may be input to the tracking feature model generation unit 20 as the position information. The tracking feature model generation unit 20 learns a tracking feature model by assuming that objects in the area indicated by the above position information in the input image are positive examples ("persons") and other objects are negative examples ("non-persons"), and outputs the trained tracking feature model.

Note that in the above embodiment, the tracking feature model is trained using deep learning with the CNN, but another type of a feature extraction method may be used to generate the tracking feature model. Moreover, when generating the tracking feature model, not only the same object in images at consecutive times (that is, time t and time t+1) but also the same object in images at more distant times (that is, time t and time t+10) may be used for learning. Accordingly, it is possible to accurately extract the target even in a case where an appearance of the object has been significantly deformed. Moreover, the tracking feature model generation unit 20 may be a center position of the target, target segmentation information of the target, or the like, other than the frame which encompasses the target as described above.

Figure 5:
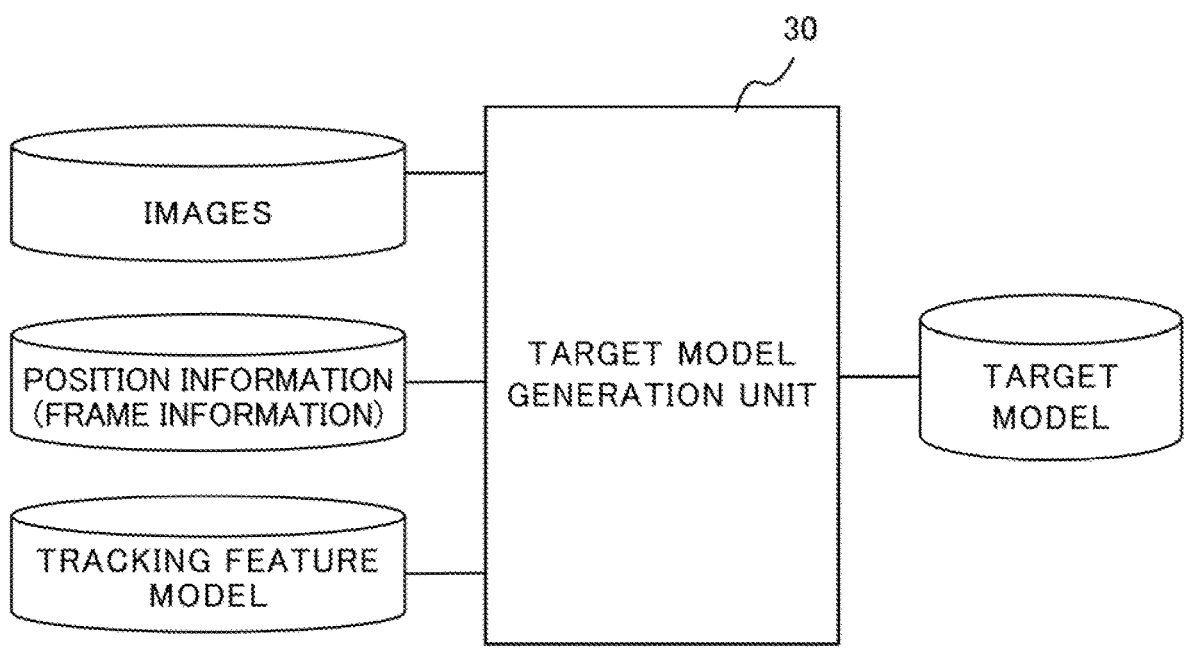
FIG. 5 is a block diagram illustrating a configuration of a target model generation unit.

FIG. 5 illustrates a configuration of the target model generation unit 30. The target model generation unit 30 generates a target model by updating the tracking feature model using image features of the target in the input image. A video image including a plurality of frame images is input to the target model generation unit 30 as the input image. The frame information of the target in the above input image is also input to the target model generation unit 30. Note that the frame information is information indicating the size and position of the target frame which encompasses the target. Moreover, the tracking feature model and the category discrimination model generated by the tracking feature model generation unit 20 are input to the target model generation unit 30. Furthermore, the tracking feature model generated by the tracking feature model generation unit 20 is input to the target model generation unit 30.

The target model is a model that indicates the image features that should be focused on for tracking the target. Here, the aforementioned tracking feature model is a model that indicates the basic features of the target object, whereas the target model is a model that indicates the individual features of the object to be tracked. For instance, if the target of tracking is a "specific person," the target model is a model that illustrates the features of the specific person specified by the user in the input image. That is, the generated target model will also include features specific to the specific person specified by the user in the input image.

The target model generation unit 30 includes a feature extractor such as the CNN, and extracts image features of the target from an area of the target frame in the input image. Next, the target model generation unit 30 uses the extracted image features of the target and the tracking feature model to generate a target model which indicates the features to be focused on for tracking that specific target. In addition to the image features of the tracking feature model, the target model also includes information such as the size and an aspect ratio of the target, and movement information including a movement direction, a movement amount, and a movement speed of the target. The target model generation unit 30 outputs the generated target model to the tracking unit 40.

Figure 6:
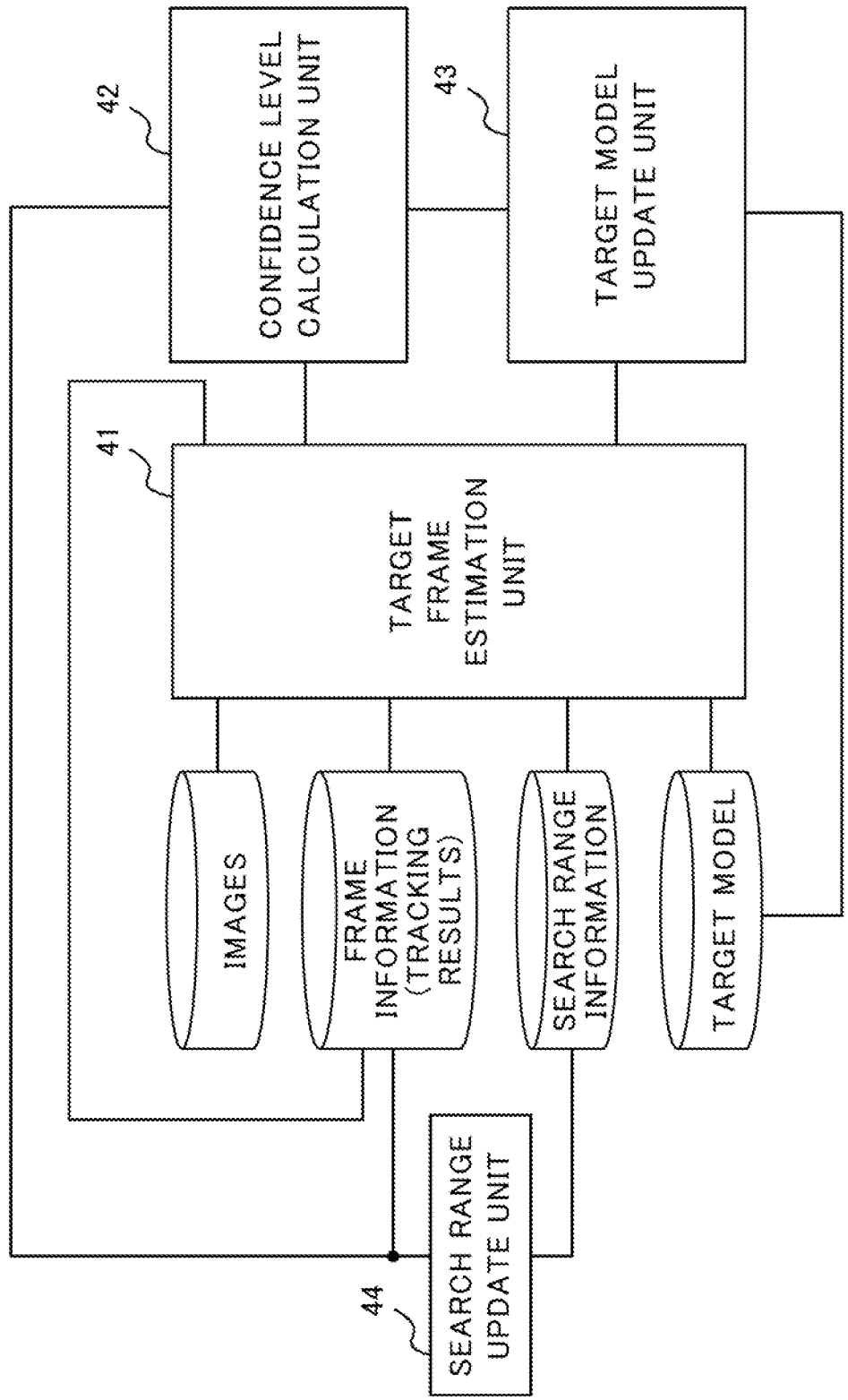
FIG. 6 is a block diagram illustrating a configuration of a tracking unit.

FIG. 6 illustrates a block diagram of the tracking unit 40. The tracking unit 40 detects and tracks the target from input images, and updates the target model using information of the object obtained during a target detection. The tracking unit has a target frame estimation unit 41, a confidence level calculation unit 42, a target model update unit 43, and a search range update unit 44.

First, the frame information is input to the search range update unit 44. This frame information includes the frame information of the target obtained as a result of tracking and a confidence level of the frame information, in a previous frame image. Note that initial frame information is input by the user. That is, when the user designates the position of the target in the input image, the position information is used as the frame information, and the confidence level is set to "1" at that time. First, the search range update unit 44 sets a target search range (also simply called a "search range") based on the input frame information. The target search range is set based on the frame information input. The target search range is the range in which the target is expected to be included in that frame image, and is set centered on the target frame in the previous frame image.

Figure 7:
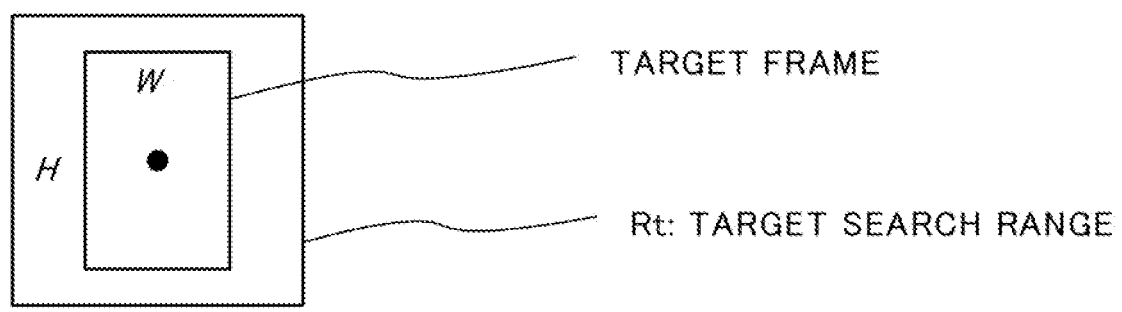
FIG. 7 illustrates a setting method of a target search range.

FIG. 7 illustrates a setting method of the target search range. In an example in FIG. 7, the frame information of the target frame, which is a rectangle of height H and width W, is input to the search range update unit 44. The search range update unit 44 first sets the target search range to the area which encompasses the target frame indicated by the input frame information.

Next, the search range update unit 44 applies a template prepared in advance to the set target search range Rt, further modifies the target search range Rt to which the template is applied using the movement information of the target, and determines the target search range Rt. The "movement information" includes the movement direction, the movement speed, movement acceleration, the movement amount, and the like.

Figure 8:
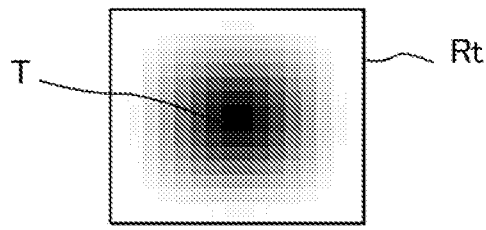
FIG. 8 illustrates an example of determining the target search range.
Figure 8:
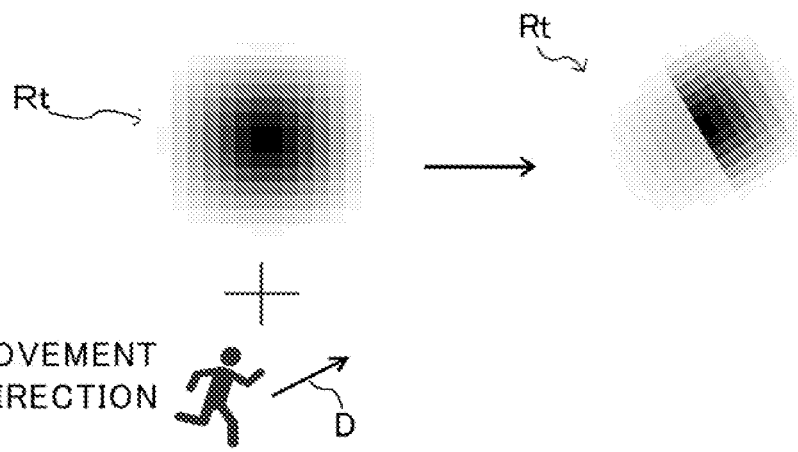
Figure 8:
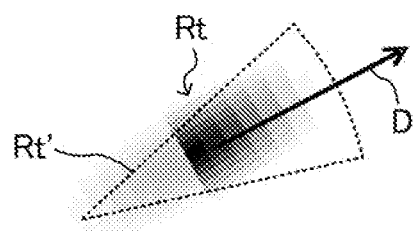
Figure 8:
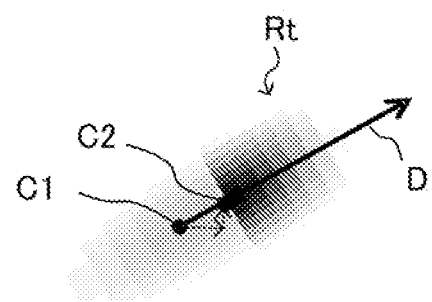

FIG. 8 illustrates an example of determining the target search range. First, the search range update unit 44 applies a template prepared in advance to the target search range Rt (process P1). A template T is formed by a distribution of weights according to positions in the template T. In the example in FIG. 8, the closer the color represented in a grayscale is to black, the greater the weight, and the closer to white, the smaller the weight. Note that the weights correspond to an existence probability of the target, and each template is created on an assumption that the position with the higher weight has a higher existence probability of the target. For instance, the weights of the template T are set according to a Gaussian distribution, where the closer to the center, the greater the weight, and the further away from a center in all directions, the smaller the weight. As a result, the target search range Rt is initially set to the range indicated by the weight distribution of the template T.

Next, the search range update unit 44 applies the weights of the target search range Rt toward the movement direction of the target (process P2). In detail, the search range update unit 44 increases the weights on a movement direction D side of the target, and decreases the weight on an opposite side of the movement direction D. For instance, the search range update unit 44 may set the weights to 1.5 times on the movement direction D side of the target, and may halve the weights on the opposite side of the movement direction D.

Next, the search range update unit 44 extends the target search range Rt in the movement direction of the target (process P3). For instance, the search range update unit 44 extends the target search range Rt in the movement direction D in proportion to a moving speed (number of moving pixels or frames) of the target on the image. Furthermore, the search range update unit 44 may contract the target search range Rt in a direction orthogonal to the movement direction D. As a result, the target search range Rt becomes an elongated shape in the movement direction D of the target. Alternatively, as depicted by a dashed line Rt' in FIG. 8, the search range update unit 44 may transform the target search range Rt into a shape which is wider on a forward side in the movement direction D of the target and narrower on a rear side in the movement direction D of the target, such as a fan shape.

Furthermore, the search range update unit 44 moves the center of weights in the target search range Rt in the movement direction D of the target based on the most recent movement amount of the target (process P4). In detail, as depicted in FIG. 8, the search range update unit 44 moves a current center C1 of the weights in the target search range Rt to a predicted position C2 of the target in a next frame.

As described above, the search range update unit 44 first applies the template prepared in advance to the target search range Rt, and then further modifies the target search range Rt based on the movement information of the target. Accordingly, it is possible to constantly update the target search range Rt to be an appropriate range according to the movement characteristics of the target.

In the above example, all of the processes P1 to P4 are performed to determine the target search range Rt, but this is not required. For instance, the search range update unit 44 may implement only processes P1 and P2, or processes P1 through P3. In the above example, the template T has the weights corresponding to the positions, but a template without weights, that is, a template with a uniform weight for the entire area, may be used. In that case, the search range update unit 44 will not perform the processes P2 and P4.

Once the target search range Rt is thus determined, the tracking unit 40 detects and tracks each target from the input image. First, the target frame estimation unit 41 estimates each target frame using the target model within the target search range Rt of the input image. In detail, the target frame estimation unit 41 extracts a plurality of tracking candidate windows belonging to the target search range Rt centered on the target frame. For instance, an RP (Region Proposal) obtained using an RPN (Region Proposal Network) or the like can be used as a tracking candidate window. Each tracking candidate window is an example of a target candidate. The confidence level calculation unit 42 compares the image features of each tracking candidate window multiplied by the weights in the target search range Rt with the target model to calculate the confidence level of each tracking candidate window. The "confidence level" is a degree of similarity with the target model. Then, the target frame estimation unit 41 determines the tracking candidate window with the highest confidence level among each tracking candidate window as the result of tracking in that image, that is, the target. This target frame information, that is, the target frame, is used in the process of the next frame image.

The target model update unit 43 determines whether the confidence level of the target frame thus obtained belongs to a predetermined value range, and the target model is updated using the tracking candidate window when the confidence level belongs to the predetermined value range. Specifically, the target model update unit 43 updates the target model by multiplying the target model by the image feature map obtained from the tracking candidate window. Note that when the confidence level of the target frame does not belong to the predetermined value range, the target model update unit 43 does not update the target model using that tracking candidate window.

In the above configuration, the target frame estimation unit 41 corresponds to examples of an extraction means and a tracking means, the search range update unit 44 corresponds to an example of search range update means, and the target model update unit 43 corresponds to an example of model update means.

[Processes by the Object Tracking Device]

Next, each process performed by the object tracking device 100 will be described. The object tracking device 100 executes a tracking feature model process, a target model generation process, and a tracking process. In the following, the processes are described in turn.

(Tracking Feature Model Generation Process)

Figure 9:
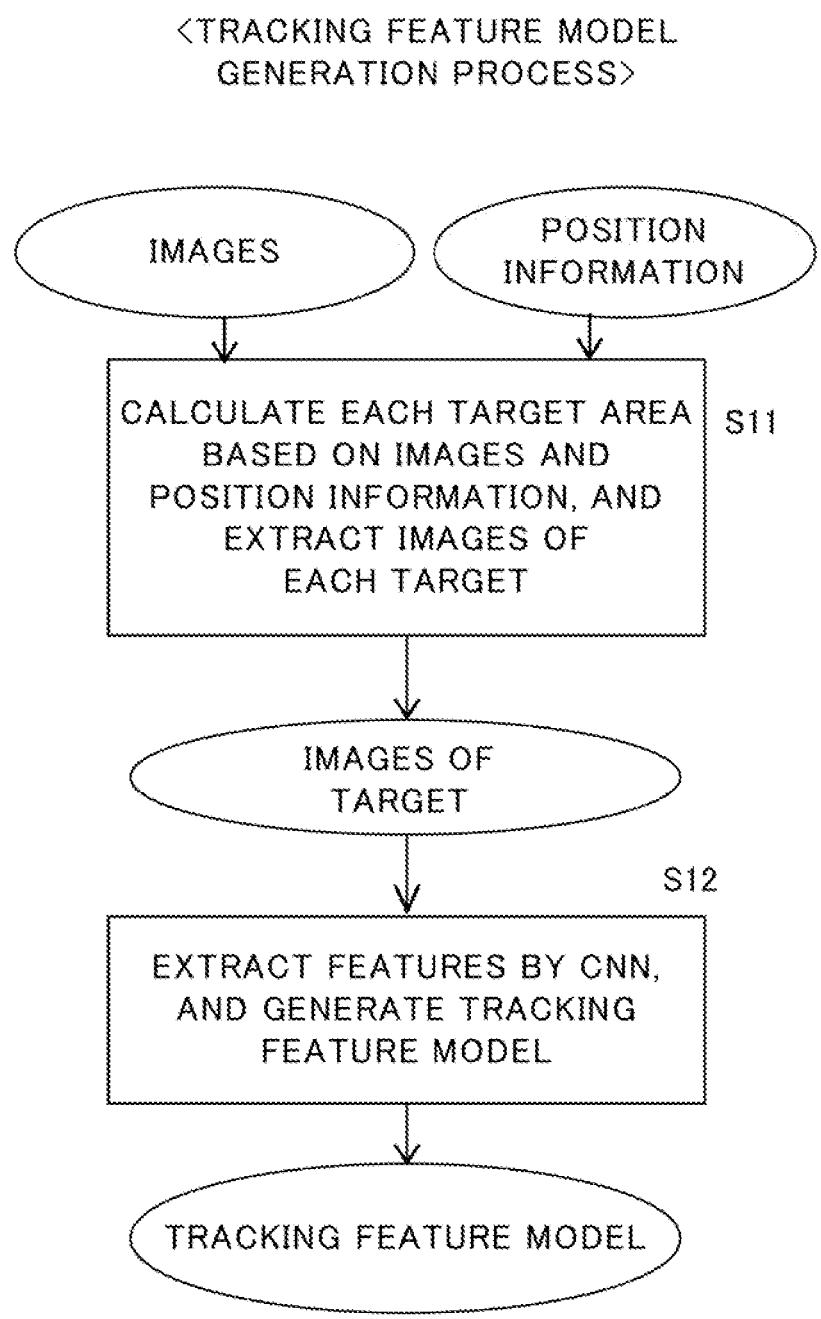
FIG. 9 is a flowchart of a tracking feature model generation process in the first example embodiment.

The tracking feature model generation process is executed by the tracking feature model generation unit 20 to generate the tracking feature model from the input image and the position information of the target. FIG. 9 is a flowchart of the tracking feature model generation process. This process is realized by the processor 12 depicted in FIG. 2 which executes a program prepared in advance.

First, the tracking feature model generation unit 20 calculates the target area in each input image based on the input image and the position information of the target in each input image, and extracts images of the target (step S11). Next, the tracking feature model generation unit 20 extracts features from the images of the target using the CNN, and generates the tracking feature model (step S12). Accordingly, the tracking feature model representing the features of the target is generated.

In the tracking feature model generation process, in order to track the same target by the tracking unit 40, the tracking feature model is generated assuming that targets in the time series images are identical. In addition, in order to prevent the passing over, the tracking feature models are generated for the target and others as different. In addition, in order to recognize objects with more detailed image features, tracking feature models are generated for different types of objects in the same category, such as a motorcycle and the bicycle, or the same object in different colors, as different objects.

(Target Model Generation Process)

Figure 10:
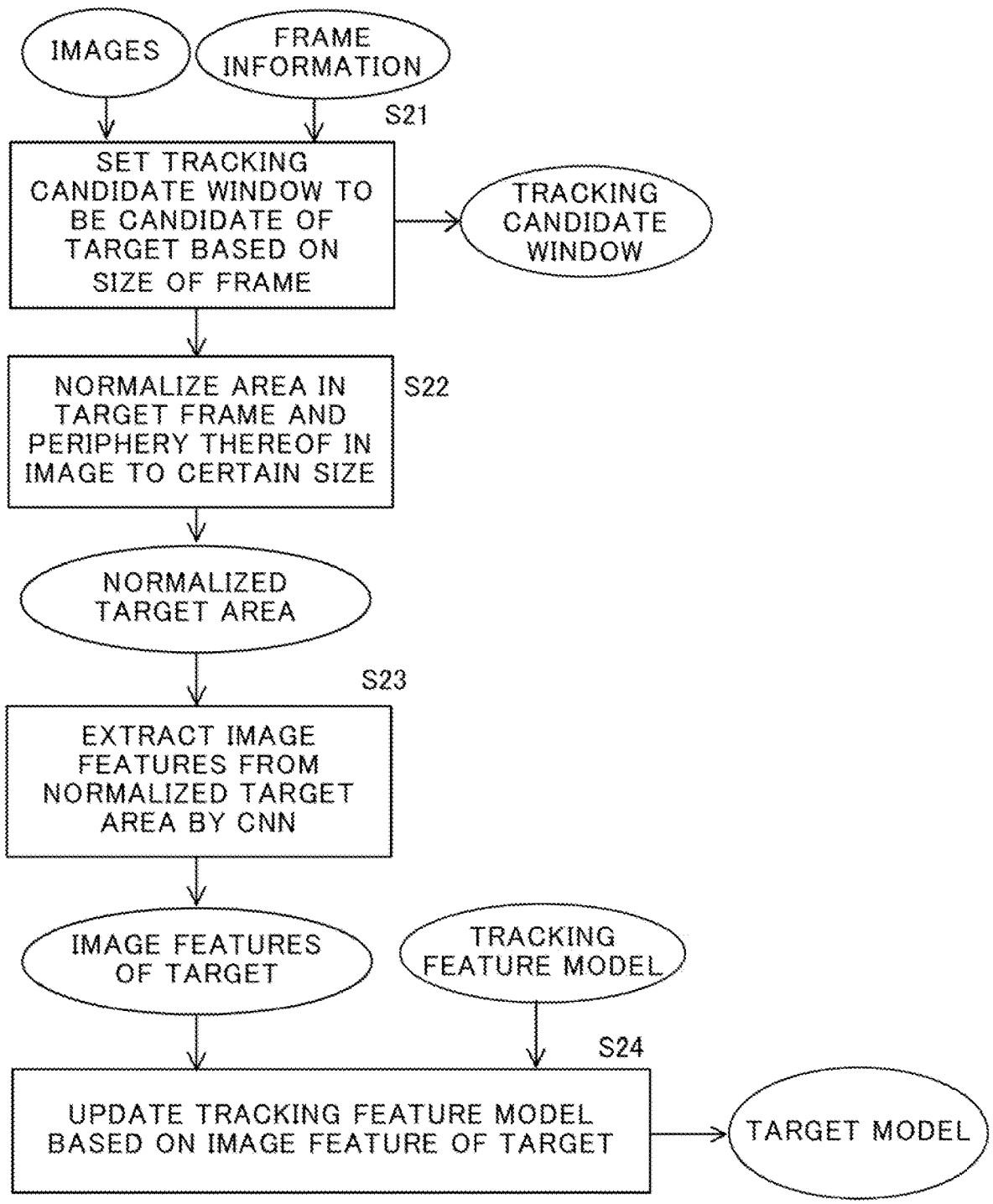
FIG. 10 is a flowchart of a target model generation process in the first example embodiment.

Following the tracking feature model generation process, the target model generation process is executed. The target model generation process is executed by the target model generation unit 30, and generates the target model using the input image, the target frame information in the input image, and the tracking feature mode. FIG. 10 is a flowchart of the target model generation process. This target model generation process is realized by the processor 12 illustrated in FIG. 2, which executes a program prepared in advance.

First, the target model generation unit 30 sets tracking candidate windows which indicate target candidates based on the size of the frame indicated by the frame information (step S21). Each tracking candidate window is a window used to search for the target in the tracking process described below, and is set to the same size as the size of the target frame indicated by the frame information.

Next, the target model generation unit 30 normalizes an area of the target frame and a periphery of the target frame in the input image to a certain size, and generates a normalized target area (step S22). This is a pre-processing step for the CNN to adjust the area of the target frame to a size suitable for an input of the CNN. Next, the target model generation unit 30 extracts image features from the normalized target area using the CNN (step S23).

Next, the target model generation unit 30 updates the tracking feature model generated by the tracking feature model generation unit 20 with the image features of the target, and generates the target model (step S24). In this example, image features are extracted from the target area indicated by the target frame using the CNN, but another method may be used to extract image features. The target model may also be represented by one or more feature spaces, for instance, by feature extraction using the CNN. As described above, in addition to the image features of the tracking feature model, the target model also retains information such as the size and aspect ratio of the target, as well as the movement information including the movement direction, the movement amount, the movement speed, and the like of the target.

(Tracking Process)

Figure 11:
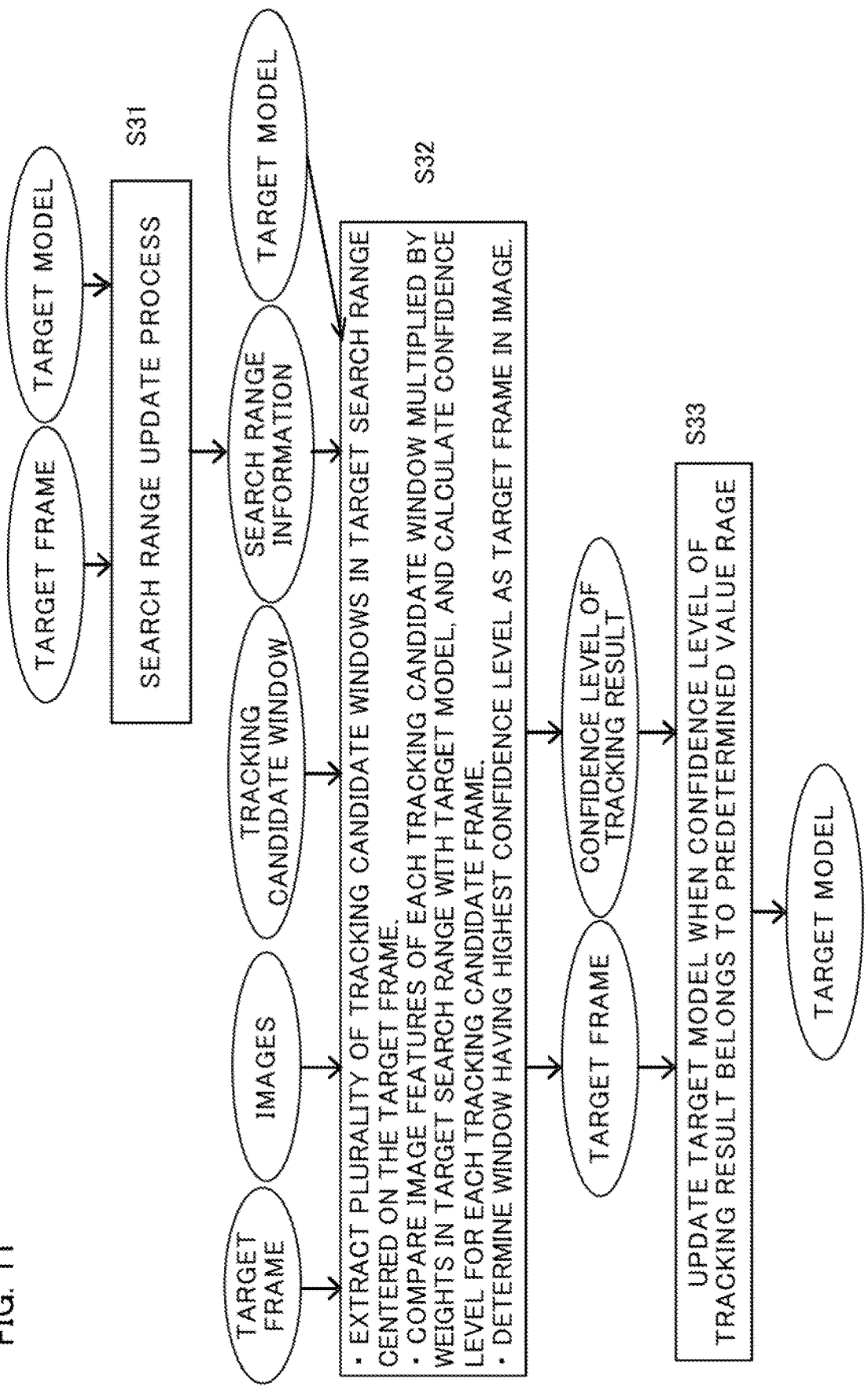
FIG. 11 is a flowchart of a tracking process in the first example embodiment.

Following the target model generation process, the tracking process is executed. The tracking process is executed by the tracking unit 40 to track the target in the input image and to update the target model. FIG. 11 is a flowchart of the tracking process. This tracking process is realized by the processor 12 illustrated in FIG. 2, which executes a program prepared in advance and operates as each of the elements depicted in FIG. 6.

First, the search range update unit 44 executes a search range update process (step S31). The search range update process updates the target search range based on the target frame in the previous frame image. The target frame in the previous frame image is generated in the tracking process described below.

Figure 12:
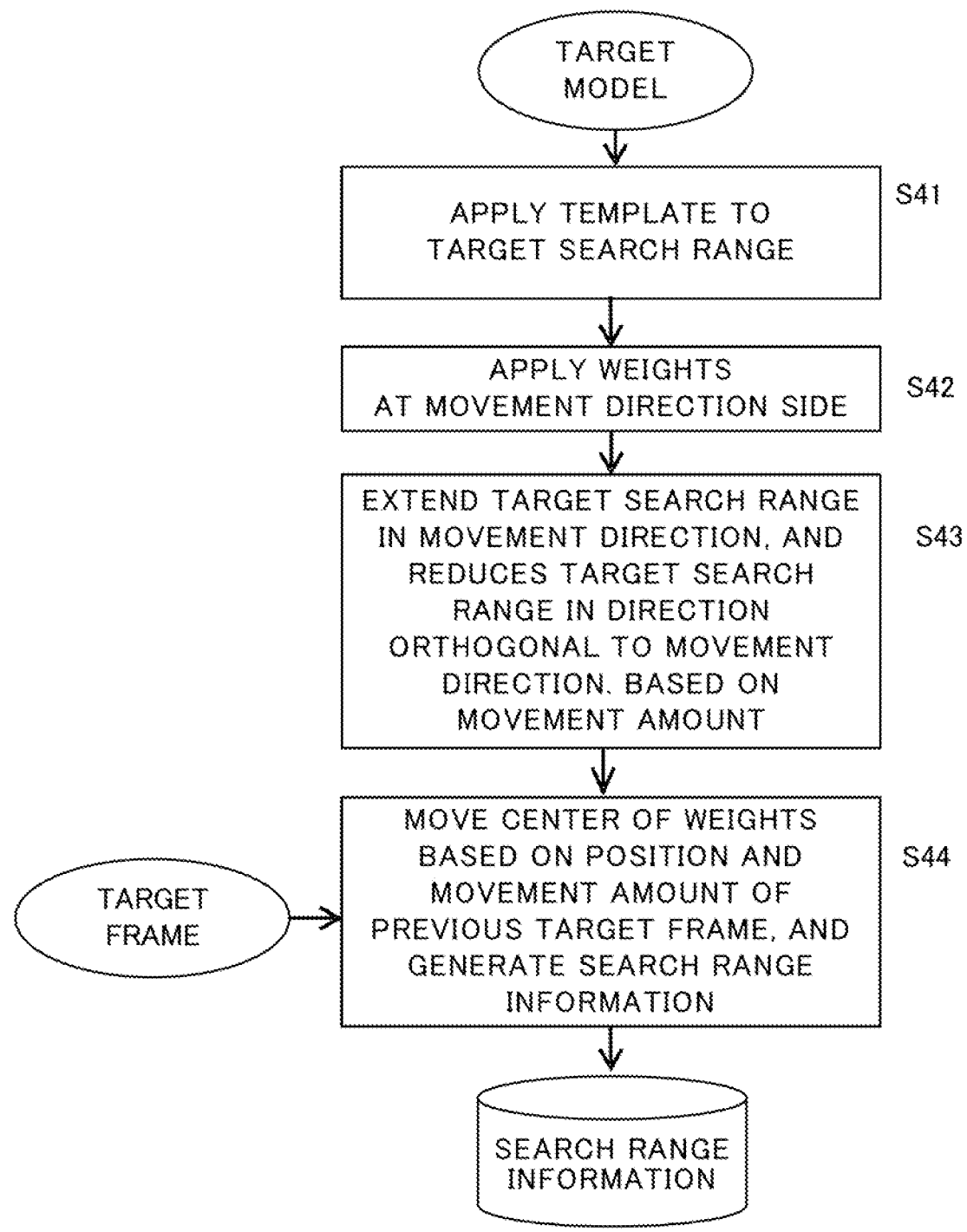
FIG. 12 is a flowchart of a search range update process in the first example embodiment.

FIG. 12 is a flowchart of the search range update process. At the beginning of the search range update process, the position of the target being input in the tracking feature model generation process is used as the target frame, and "1" is used as the confidence level of the target frame.

First, the search range update unit 44 applies the template prepared in advance to the target search range Rt (step S41). This process corresponds to the process P1 depicted in FIG. 8.

Next, the search range update unit 44 modifies the target search range Rt based on the movement direction and the movement amount of the target. In detail, first, the search range update unit 44 applies the weights of the target search range Rt to the movement direction of the target (step S42). This process corresponds to the process P2 depicted in FIG. 8.

Next, the search range update unit 44 extends the target search range Rt in the movement direction of the target, and contracts the target search range Rt in the direction orthogonal to the movement direction of the target, based on the movement direction of the target indicated by the target model (step S43). This process corresponds to the process P3 depicted in FIG. 8. At this time, the target search range Rt may be contracted in a direction opposite to the movement direction of the target as described above, and the target search range Rt may be shaped like a fan.

Next, the search range update unit 44 moves the center of the weights in the target search range Rt based on the position of the target frame in the previous frame image and the amount of target movement. This process corresponds to the process P4 illustrated in FIG. 8. Next, the search range update unit 44 generates search range information indicating the target search range Rt (step S44), and terminates the search range update process.

As described above, in the search range update process, the target search range Rt is modified based on the movement information such as the movement direction and the movement amount of the target. Accordingly, it is possible to constantly update the target search range Rt to be an appropriate range according to the movement characteristics of the target.

Next, the process returns to FIG. 11, and the target frame estimation unit 41 extracts a plurality of tracking candidate windows which belong to the target search range centered on the target frame. The confidence level calculation unit 42 compares the image features of each tracking candidate window multiplied by the weights in the target search range Rt with the target model, and calculates the confidence of each tracking candidate window. Subsequently, the target frame estimation unit 41 determines the tracking candidate window with the highest confidence level among the tracking candidate windows, as the target frame in that image (step S32). Thus, the target tracking is performed.

Next, the target model update unit 43 updates the target model using the obtained target frame when the confidence level of the tracking result belongs to a predetermined value range (step S33). Accordingly, the target model is updated.

As described above, according to the first example embodiment, because the target search range is set using a template according to a movement pattern of the target, and the target search range is updated according to the movement direction and the movement amount of the target, it is possible to always track the target in the appropriate target search range. As a result, it is possible to prevent the occurrence of the passing over.

Second Example Embodiment

Figure 13:
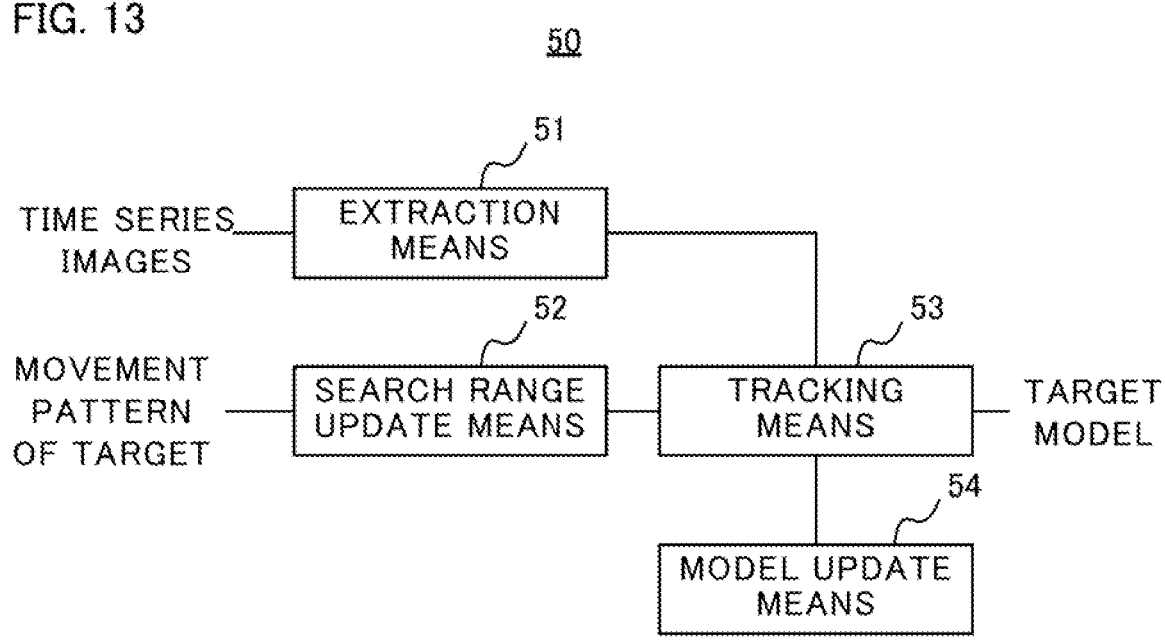
FIG. 13 is a block diagram illustrating a functional configuration of an object tracking device according to a second example embodiment.

FIG. 13 is a block diagram illustrating a functional configuration of an object tracking device 50 for a second example embodiment. The object tracking device 50 includes an extraction means 51, a search range update means 52, a tracking means 53, and a model update means 54. The extraction means 51 extracts target candidates from time series images. The search range update means 52 updates the search range based on the frame information of the target in the previous image in the time series and the movement information of the target. The tracking means 53 searches for and tracks the target from the target candidates extracted within the search range using the confidence level indicating the similarity with the target model. The model update means 54 updates the target model using the target candidates extracted within the search range.

Figure 14:
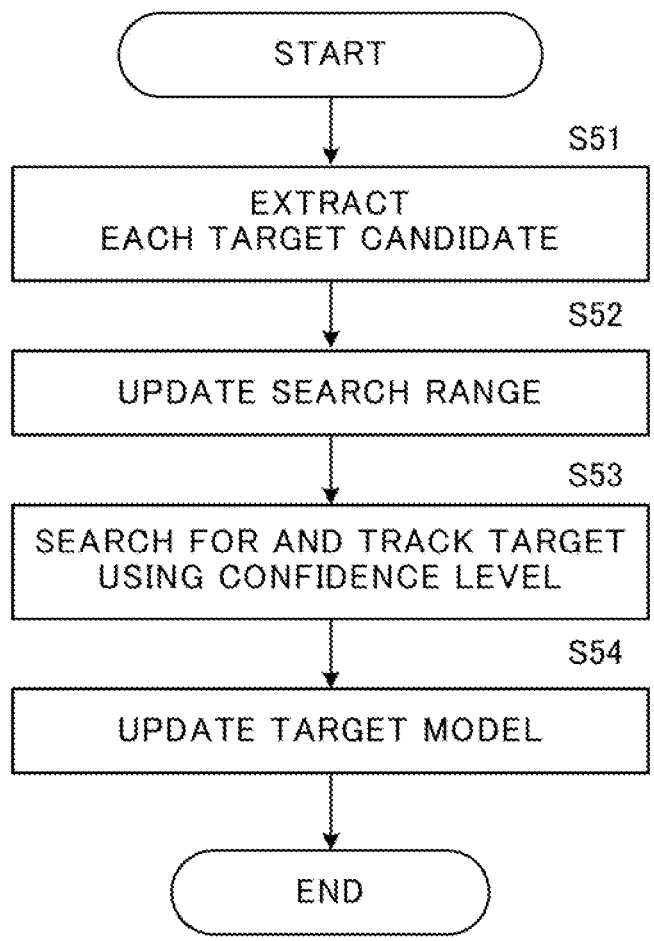
FIG. 14 is a flowchart of an object tracking process the second example embodiment.

FIG. 14 is a flowchart of the object tracking process according to the second example embodiment. The extraction means 51 extracts each target candidate from the time series images (step S51). The search range update means 52 updates the search range based on the frame information of the target in the previous image in the time series and the movement information of the target (step S52). The tracking means 53 searches for and tracks the target from the target candidates extracted within the search range using the confidence level indicating the similarity with the target model (step S53). The model update means 54 updates the target model using the target candidates extracted within the search range (step S54).

According to the object tracking device of the second example embodiment, since the target search range is set based on the movement information of the target, it is always possible to track the target in the appropriate target search range. As a result, it is possible to prevent the occurrence of the passing over.

A part or all of the example embodiments described above may also be described as the following supplementary notes, but not limited thereto.

(Supplementary note 1)

An object tracking device comprising:
an extraction means configured to extract target candidates from time series images;
a search range update means configured to update a search range based on frame information of a target in a previous image in a time series and movement information of the target;
a tracking means configured to search for and track the target using a confidence level indicating similarity with a target model, from among the target candidates extracted in the search range; and
a model update means configured to update the target model using the target candidates extracted in the search range.

(Supplementary Note 2)

The object tracking device according to supplementary note 1, wherein the search range update means sets a template formed by a distribution of weights as the search range.

(Supplementary Note 3)

The object tracking device according to supplementary note 2, wherein the search range update means modifies the distribution of the weights in the search range by increasing the weights at a movement direction side of the target so as to decrease weights at an opposite side to the movement direction.

(Supplementary Note 4)

The object tracking device according to supplementary note 3, wherein the search range update means extends the search range in the movement direction of the target.

(Supplementary Note 5)

The object tracking device according to supplementary note 4, wherein the search range update means contracts the search range in a direction orthogonal to the movement direction of the target.

(Supplementary Note 6)

The object tracking according to any one of supplementary notes 3 to 5, wherein the search range update means moves a center of the weights in the search range based on the movement amount of the target.

(Supplementary Note 7)

The object tracking device according to any one of supplementary notes 2 to 6, wherein the tracking means calculates the confidence level between image features of each of the target candidates multiplied with weights in the search range and the target model.

(Supplementary Note 8)

An object tracking method comprising:
extracting target candidates from time series images;
updating a search range based on frame information of a target in a previous image in a time series and movement information of the target;
searching for and tracking the target using a confidence level indicating similarity with a target model, from among the target candidates extracted in the search range; and
updating the target model using the target candidates extracted in the search range.

(Supplementary Note 9)

A recording medium storing a program, the program causing a computer to perform a process comprising:
extracting target candidates from time series images;
updating a search range based on frame information of a target in a previous image in a time series and movement information of the target;
searching for and tracking the target using a confidence level indicating similarity with a target model, from among the target candidates extracted in the search range; and
updating the target model using the target candidates extracted in the search range.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

11 Input IF
12 Processor
13 Memory
14 Recording medium
15 Database
16 Input device
17 Display device
20 Tracking feature model generation unit
30 Target model generation unit
40 Tracking unit
41 Target frame estimation unit
42 Confidence level calculation unit
43 Target model update unit
100 Object tracking device
Rt Target search range

What is claimed is:

1. An object tracking device comprising:
a memory storing instructions; and
one or more processors configured to execute the instructions to:
extract target candidates from time series images;
update a search range based on frame information of a target in a previous image in a time series and movement information of the target;
search for and track the target using a confidence level indicating similarity with a target model, from among the target candidates extracted in the search range;
update the target model using the target candidates extracted in the search range;
set a template formed by a distribution of weights as the search range;
modify the distribution of the weights in the search range by increasing the weights at a movement direction side of the target so as to decrease weights at an opposite side to the movement direction;
extend the search range in the movement direction of the target; and
contract the search range in a direction orthogonal to the movement direction of the target.

2. The object tracking according to claim 1, wherein the processor moves a center of the weights in the search range based on the movement amount of the target.

3. The object tracking device according to claim 1, wherein the processor calculates the confidence level between image features of each of the target candidates multiplied with weights in the search range and the target model.

4. An object tracking method comprising:
extracting target candidates from time series images;
updating a search range based on frame information of a target in a previous image in a time series and movement information of the target;
searching for and tracking the target using a confidence level indicating similarity with a target model, from among the target candidates extracted in the search range; and
updating the target model using the target candidates extracted in the search range setting a template formed by a distribution of weights as the search range;
modifying the distribution of the weights in the search range by increasing the weights at a movement direction side of the target so as to decrease weights at an opposite side to the movement direction;
extending the search range in the movement direction of the target; and
contracting the search range in a direction orthogonal to the movement direction of the target.

5. A non-transitory computer-readable recording medium storing a program, the program causing a computer to perform a process comprising:
extracting target candidates from time series images;
updating a search range based on frame information of a target in a previous image in a time series and movement information of the target;

searching for and tracking the target using a confidence level indicating similarity with a target model, from among the target candidates extracted in the search range;

updating the target model using the target candidates extracted in the search range;

setting a template formed by a distribution of weights as the search range;

modifying the distribution of the weights in the search range by increasing the weights at a movement direction side of the target so as to decrease weights at an opposite side to the movement direction;

extending the search range in the movement direction of the target; and contracting the search range in a direction orthogonal to the movement direction of the target.

\* \* \* \* \*